United States Patent [19]

Sheridan

[11] 4,251,170

[45] Feb. 17, 1981

[54] ABRASION RESISTANT BEND AND METHOD FOR SMALL PIPELINES

[76] Inventor: Joseph U. Sheridan, P.O. Box 835, Saugatuck, Mich. 49453

[21] Appl. No.: 55,704

[22] Filed: Jul. 9, 1979

[51] Int. Cl.³ .................. F16L 55/00; B65Q 53/52
[52] U.S. Cl. .................. 406/197; 406/193; 138/99; 138/103; 138/110; 138/172; 285/16; 285/179
[58] Field of Search .................. 138/97, 92, 99, 103, 138/110, 172, 155, 178; 285/16, 17, 55, 179; 406/193, 191, 194, 197; 196/133

[56] References Cited

U.S. PATENT DOCUMENTS

| | | | |
|---|---|---|---|
| 1,357,259 | 11/1920 | Strong | 285/16 |
| 1,889,480 | 11/1932 | Kelley | 406/193 X |
| 3,833,267 | 9/1974 | McCumber | 406/193 |
| 3,977,730 | 8/1976 | Seick | 138/92 X |
| 4,130,300 | 12/1978 | Sheridan | 285/16 |

FOREIGN PATENT DOCUMENTS

272588  6/1927  United Kingdom .................. 285/16

*Primary Examiner*—James E. Bryant, III
*Attorney, Agent, or Firm*—B. B. Olive

[57] ABSTRACT

An abrasion resistant bend or elbow like construction for small pipelines of relatively small, i.e., 2 to 8 inch, inside diameter is formed of soft, ductile metal, normally mild steel. The outside bend portion most subject to abrasive attack is prefitted prior to use with a frame and cover arrangement which receives, maintains and provides a dustproof and pressure tight cover over a plurality of ceramic wear liners which receive the abrasive attack after the metal forming the outside bend portion is worn away in use.

2 Claims, 8 Drawing Figures

U.S. Patent  Feb. 17, 1981  Sheet 1 of 2  4,251,170
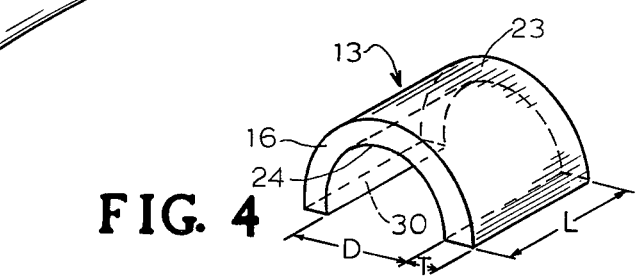
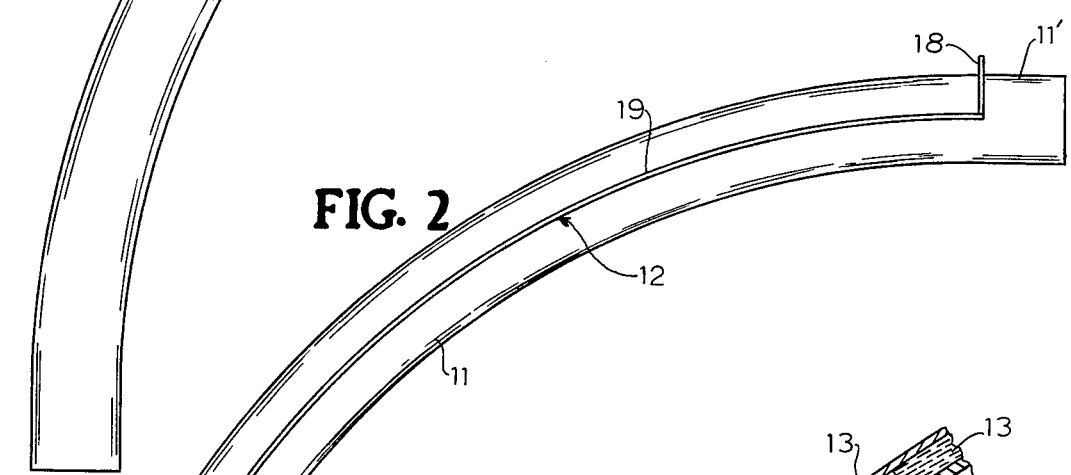
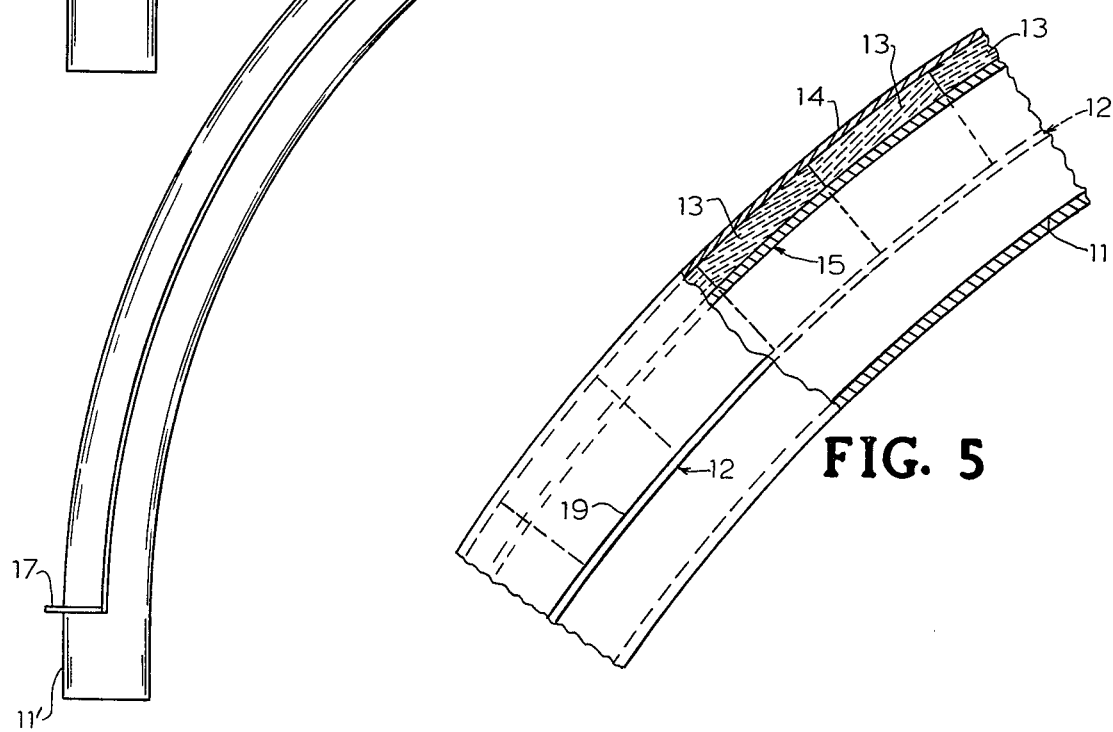

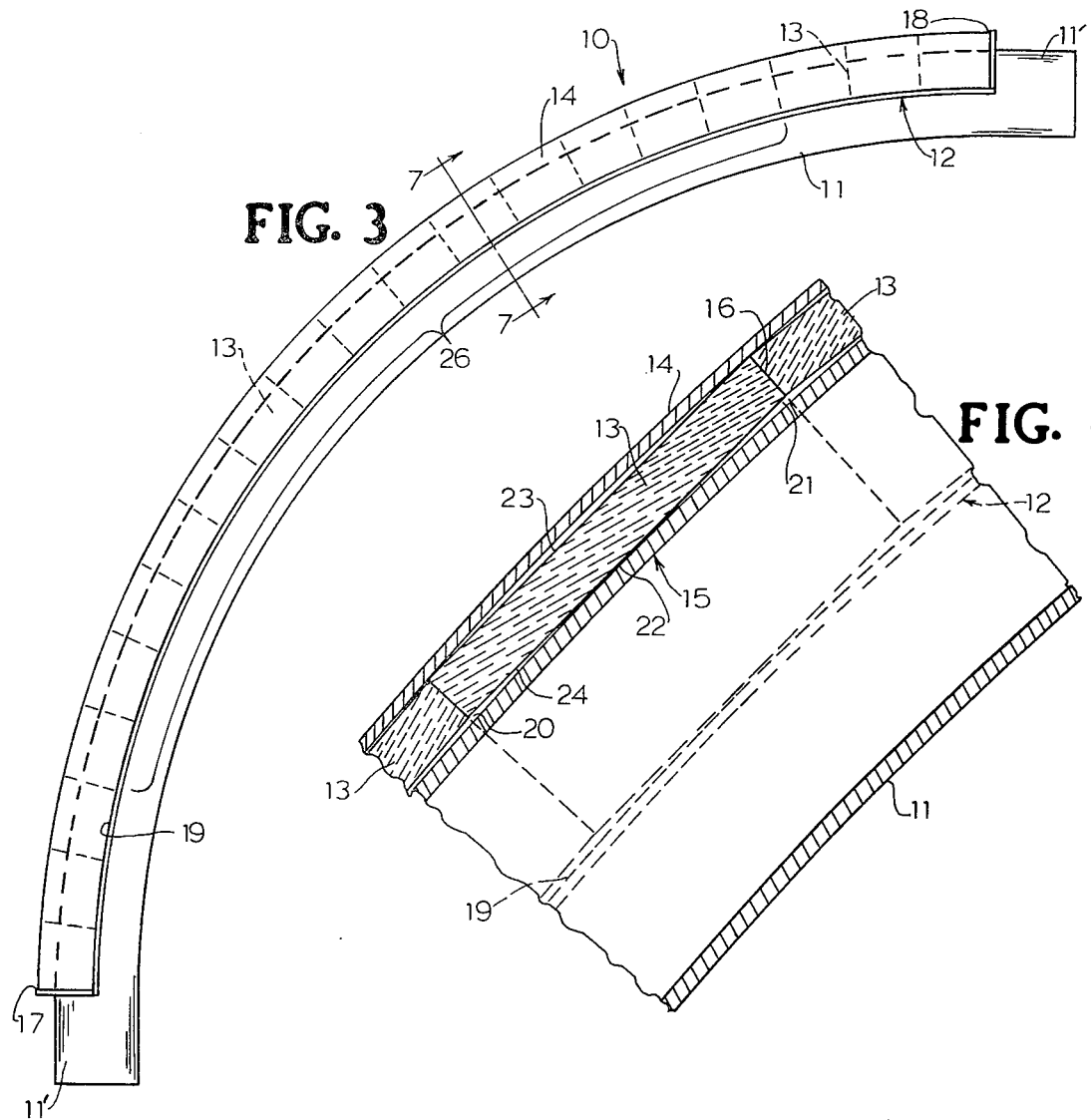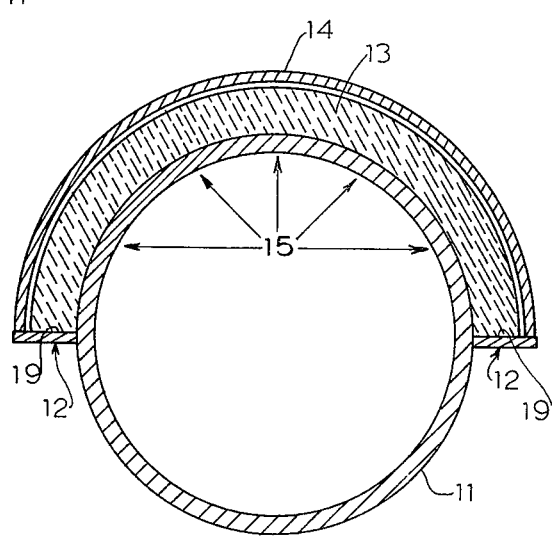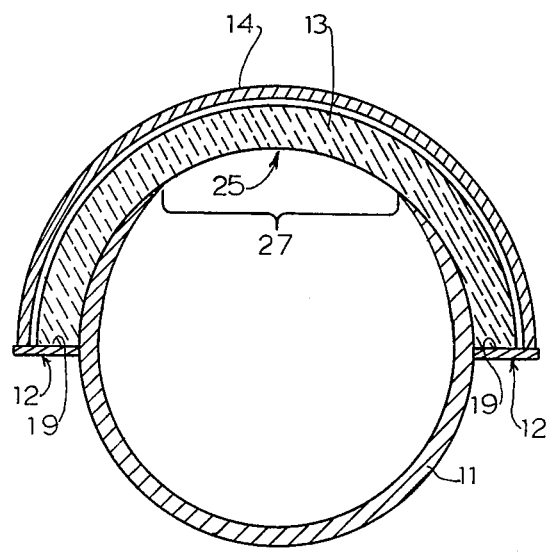

ABRASION RESISTANT BEND AND METHOD FOR SMALL PIPELINES

BACKGROUND OF THE INVENTION

1. Field of the Invention

The invention relates generally to an abrasion resistant bend or elbow-like construction and more particularly to an abrasion resistant bend construction for a small pipeline.

2. Description of the Prior Art

The need to move large volumes of a highly abrasive material places great demands on the piping system through which it is conveyed. Various areas of industry encounter these problems as many different abrasive products are moved, e.g., coal, grain, sand and various waste products. Excessive wear is a common occurrence throughout these areas of industry with the problem being especially severe in pipe sections which change the direction of flow.

As is known, upon a change in the direction of flow of a fluid containing abrasive particles, the wall facing the oncoming stream is subjected to a continuous bombardment of such particles. The result is that the outer bends of the pipes in these transport systems are rapidly worn down and the fittings must be patched or replaced at frequent intervals to prevent leakage of dust, contamination of the surrounding atmosphere, et cetera, so as to avoid health hazards as well as explosive situations. The down time and other costs accrued in the need to continually make such repairs represent a substantial economic loss.

In previous attempts to resolve this problem, a variety of approaches have been taken but a wholly satisfactory solution has not resulted from these efforts. Also, in some instances, the approaches which have been taken provide a more satisfactory solution for large diameter, fabricated elbow constructions made of relatively hard material than they do for relatively small diameter bends formed of relatively soft, ductile metal.

As illustrated in U.S. Pat. Nos. 1,246,189 and 3,551,006, one approach has been to provide an elbow with an abrasion resistant lining.

In U.S. Pat. No. 1,211,784, an elbow construction is described which consists of two separate semi-cylindrical sections with the medial portion of one section being enlarged to accomodate a recess into which lining blocks are inserted.

Another approach is illustrated in U.S. Pat. No. 3,977,730 where impact plate is fixed to the outside surface of the outer bend of the pipe elbow.

In U.S. Pat. No. 3,794,359, a pipe elbow fabricated entirely from non-metallic materials is described. The elbow consists of a pair of wear plates of ceramic material having a semi-circular shape and assembled circumferentially in opposing spaced relationship to each other. A resinous grout is disposed in the circumferential space between the opposed wear plates and a fiberglass reinforced resin provides a cover over the wear plates and grout.

A liner construction for repair of worn elbows is manufactured by A. P. Green Refractories Company, Green Boulevard, Mexico, Mo. 65265. This approach provides ceramic segment liners mitered to fit at the joints and which match the elbow radius. The joints are filled with epoxy to provide an epoxy bond and a steel band, one per segment, extends around the segment liner and the pipe to hold the liner in place. However, a large hole once worn away in the pipe tends to allow the pipe to expand and leakage may develop, particularly with large size, hardened pipe.

A more recent development is illustrated in applicant's prior U.S. Pat. No. 4,130,300 in which there is illustrated a composite pipe elbow formed of welded-together sections of relatively hard steel and having a plurality of ceramic wear liners held in place over an opening at the outside bend portion of the elbow with a frame and cover arrangement to receive and cover the wear liners. While providing a satisfactory abrasion resistant elbow construction for relatively large diameter pipe lines, the composite type elbow of this prior patent depends upon the pipe being formed of relatively hard steel, being formed of individual sections and requiring the forming of an opening in the sections. Also, the forming of the opening allows the pipe to expand where formed and experience has shown the need for a method and construction better adapted to non-hardened, small diameter pipe.

With all of the foregoing prior art in mind, an object of the present invention is to provide an abrasion resistant bend construction for small pipelines, generally in the range of 2 to 8 inches inside diameter, which particularly lends itself to pipelines formed of relatively soft and ductile metal which can be readily bent, is essentially dust-proof and pressure proof over its service life, eliminates the need to form an opening in the elbow prior to installation, takes advantage of the known tendency of ductile, non-hardened steel not to expand such an opening or at a point of wear and eliminates the need to employ epoxy or other bonding materials between the wear liners. Other objects will appear as the description proceeds.

SUMMARY OF THE INVENTION

The abrasion resistant composite bend construction of the present invention comprises a uniformly bent pipe of relatively small inside diameter, in the range of 2 to 8 inches, formed or relatively soft and ductile material, normally mild steel, which can be readily bent, a frame integrally secured and prefitted to the outer bend portion of the pipe prior to use and covering an area greater than the area normally subject to abrasion attack, a plurality of ceramic wear liners resting on the frame and having angular ends enabling the wear liners to snugly abut each other and being of relatively short length so as to collectively approximate the long curvature of the long radius of the bend and having a cross-sectional curvature to slip-fit and substantially match the cross-sectional curvature of the bent pipe and a cover plate providing a pressure type seal over the wear liners to effectively render the elbow leak proof and pressure tight in the area of the bend most subject to abrasive attack.

DESCRIPTION OF THE DRAWINGS

FIG. 1 is a side elevation view of a pipe of relatively small inside diameter bent to a radius preparatory to being modified according to the invention.

FIG. 2 is a side elevation view of the bend shown in FIG. 1 and with a wear liner receiving frame integrally secured thereto according to the invention, the side not shown being a mirror image thereof.

FIG. 3 is a side elevation view of the bend and frame of FIG. 2 with the wear liners in place as indicated in dashed lines and with the cover plate installed.

FIG. 4 is a perspective view of a ceramic wear liner of the type employed in the construction of FIG. 3.

FIG. 5 is an enlarged partially fragmentary side elevation section view of the construction shown in FIG. 3.

FIG. 6 is a further fragmentary enlargement of a portion of the section view of FIG. 5.

FIG. 7 is an enlarged section view taken along line 7—7 of FIG. 3 illustrating the internal thickness of the outer bend of the pipe wall prior to any abrasive action thereon.

FIG. 8 is a section view similar to that of FIG. 7 but illustrating the internal wall thickness of the outer bend of the pipe after abrasive action has removed a portion of such wall.

DESCRIPTION OF THE PREFERRED EMBODIMENT

As illustrated in the drawings, the composite bend 10 of the invention comprises a bent pipe 11, a frame 12, a plurality of ceramic wear liners 13 and a cover plate 14 which is secured to frame 12 and in conjuction with frame 12 provides a pressure tight and leak proof housing and rigid holder for keeping liners 13 in place and for preventing expansion of pipe 11 when worn.

Generally speaking, the composite elbow 10 of the invention is intended to be used in pipe lines having an inside diameter in the range of from about two inches to about eight inches and of relatively thin wall thickness. The bent pipe 11 is also intended to be relatively soft and ductile and will normally be formed of non-heat treated, mild steel. Pipe 11 is thus adapted to be bent into the appropriate radius as illustrated and is formed with tangential end sections 11' of appropriate length for being joined to other portions of the piping system in which the bend 10 of the invention is used such as by use of sleeve or flange couplings or welding. The bent portion of pipe 11 is of uniform bend.

While the relatively soft and ductile type material is desirable for bending, it will also be immediately appreciated that when a band made of such material is employed to transfer abrasive material that the inner surface of the outer bend will be subject to abrasive attack and will gradually wear away in use to form an opening through which the abrasive material, unless otherwise contained, will be discharged into the space surrounding the location of the bend. The composite bend 10 of the invention is intended to provide a relatively long life wear surface, once such an opening forms in the outer bend of pipe 11, and is also intended to provide a pressure tight and leak proof housing around such opening once it forms in service.

Referring back to the drawings, frame 12 consists of a series of metal side and end strips which are welded together and also welded to the surface of pipe 11 so as to circumscribe an area substantially exceeding the area in the outer bend portion 15 of pipe 11 in which an opening is typically formed by abrasive attack of the material being transferred through pipe 11. The strip members of frame 12 may be typically attached together and to pipe 11 by light fillet weld and may generally follow the construction of the frame previously described in my prior U.S. Pat. No. 4,130,300. However, unlike the construction and method of prior Pat. No. 4,130,300, frame 12 in the present invention, when initially installed, will surround an uninterrupted continuous outer bend surface portion of pipe 11 and without an opening being preformed in pipe 11 as in the construction of the prior patent. This step of forming an opening in pipe 11 is thus avoided by the construction of the present invention. However, the size of the anticipated opening due to wear can be predicted from experience with the particular size pipe, radius of bend and material transferred and the area circumscribed by frame 12 can be defined accordingly.

After frame 12 has been attached to pipe 11, the relatively short half cylinder-shaped ceramic wear liners 13 are positioned in place on the outer bend portion 15 and are designed to rest together in a snug fit on their mating end surfaces and also to fit against the inner end rim surfaces 17, 18 of frame 12 in a keystone-type arrangement. The respective ceramic wear liners 13 are also designed so as to be relatively shorth length with no curvature in the long direction and with a cross-sectional curvature to slip-fit and substantially match the outside surface curvature of the pipe. Thus, each liner touches the pipe only in a middle portion of the liner. Use of compound liner curvature is avoided and minimal gap space between the liners and the outer pipe surface is achieved. The outer flat bottom surfaces 30 of the respective wear liners rest on the respective inner side support surfaces 19 of frame 12 and frame 12 is formed to minimize the gap there. The ends 16 of liners 13 are angled or mitered to effect this snug-fit arrangement as illustrated at points 20, 21 and 22 in FIG. 6.

One of the advantages of the invention is that ceramic wear plates of the kind required for the invention are available from existing commercial sources according to the requirements of the invention. Such wear liners are composed of a ceramic material processed at elevated temperatures and are fabricated to the desired shape and size and are available with longitudinal curvature. A substantially pure, high density, alumina ceramic is an especially suitable material for use in fabrication of the wear liners 13. Such a material is marketed by A. P. Green Refractories Company of Mexico, Mo. The optimum liner inner diameter D, thickness T and length L illustrated in FIG. 4 will vary depending upon the pipe diameter in which the liners are used. A representative liner for the present invention when applied to a pipe bend of 48 inch radius was ⅝ inches thick, 4 inches long and had an inner diameter of 4 ½ inches. Twenty such liners were used. The tangential sections 11' were 4 ½ inches long in the example given for each end of pipe 11 to facilitate appropriate coupling attachments.

A suitably formed steel cover plate 14 is put into place on top of the liners 13 with the outer edges thereof resting on and welded or otherwise secured to frame 12 so as to provide a leak proof, pressure tight, steel housing with the appropriately curved top surface 23 of the liners 13 substantially conforming to the inner surface of cover plate 14 and the bottom surface 24 of the liners 13 being appropriately curved to substantially conform to the cross-sectional curvature of pipe 11 as best illustrated in FIGS. 5, 6, and 7 and in a slip-fit-like relation.

As further illustrated in FIGS. 7 and 8, once the bend is installed, the inner surface of pipe 11 at the outer bend portion will be subject to the maximum abrasive attack and ultimately will form an opening of substantial length and width when fully worn, as indicated by brackets 26 and 27 in FIGS. 3 and 8. However, it will be noticed here that the projected width 27 and projected length 26 of the opening formed by the abrasive attack will provide an area of substantially less area than the contact area of the inner surface 21 of the ceramic liners 13. Further, by reason of the snug-fitting relation of the ceramic liners 13 being retained by the cover plate 14, an essentially leak proof and pressure tight construction is provided without requiring the introduction of an epoxy or other bonding agent between the individual ceramic liners 13 as has been required in prior art practices. Also, by prefitting pipe 11 with the frame, cover and liner arrangement of the invention prior to use and without forming an opening and by utilizing the relatively short liners as described minimal gap space is produced between the liners and the outer surface of the pipe opposite the inner surfaces of the liners mounted thereon. Thus, a very practical abrasion resistant bend for small diameter pipelines has been achieved.

What is claimed is:

1. A composite abrasion resistant pipe bend for use in pipe lines of relatively small diameter, comprising:
   (a) an integral length of pipe having prior to use a major continuous central portion bent on a predetermined uniform radius and terminating in continuous linear end portions, said pipe being formed of substantially soft, ductile metal and having an inside diameter within the range of two to eight inches;
   (b) an open frame member mounted on a continuous outer bend portion of said bend and forming a rim around an enclosed continuous area on said outer bend portion substantially in excess of the area defined by an anticipated opening ultimately formed in said continuous bend portion by abrasive attack;
   (c) a plurality of half cylinder shaped ceramic wear liners seated within said rim in a snug-fitting keystone configuration completely filling said enclosed area and forming an impact wall proximate the outer surface of said outer bend portion, said liners having a curvature and slip-fit-like relation to the outer surface of said pipe in a cross-sectional plane, being devoid of curvature in the longitudinal direction and having a relatively short length such that the group of liners approximate with their composite long curvature the long curvature of the opposing outer pipe surface to provide minimal gap area therebetween and with the area of said impact wall being substantially in excess of said anticipated opening; and
   (d) an appropriately curved cover plate positioned over said wear liners in substantially snug-fitting relation and secured to said rim to provide a leak proof and pressure tight housing enclosing said liners upon the formation of said opening during the course of abrasive wear of said bend.

2. The method of utilizing a bend in a pipeline of small inner diameter handling an abrasive material which in the course of use is anticipated to have an opening formed in the outer bend portion thereof due to abrasive attack, comprising:
   (a) installing in a pipeline of compatible small inner diameter within the range of two to eight inches a bend which comprises prior to use:
      (i) an integral length of pipe having prior to use a major continuous central portion bent on a predetermined uniform radius and terminating in continuous linear end portions, said pipe being formed of substantially soft, ductile metal and having an inside diameter within the range of two to eight inches;
      (ii) an open frame member mounted on a continuous outer bend portion of said bend and forming a rim around an enclosed continuous area on said outer bend portion substantially in excess of the area defined by an anticipated opening ultimately formed in said continuous bend portion by abrasive attack;
      (iii) a plurality of half cylinder shaped ceramic wear liners seated within said rim in a snug-fitting keystone configuration completely filling said enclosed area and forming an impact wall proximate the outer surface of said outer bend portion, said liners having a curvature and slip-fit-like relation to the outer surface of said pipe in a cross-sectional plane, being devoid of curvature in the longitudinal direction and having a relatively short length such that the group of liners approximate with their composite long curvature the long curvature of the opposing outer pipe surface to provide minimal gap area therebetween and with the area of said impact wall being substantially in excess of said anticipated opening; and
      (iv) an appropriately curved cover plate positioned over said wear liners in substantially snug-fitting relation and secured to said rim to provide a leak proof and pressure tight housing enclosing said liners upon the formation of said opening during the course of abrasive wear of said bend;
   (b) transferring abrasive material through said pipeline until the inner wall of said outer bend portion is worn and the continuous surface is interrupted and said opening is formed by said abrasive attack; and
   (c) after said opening is formed utilizing the impact wall provided by said liners to receive said attack in said outer bend portion and said housing to provide a pressure tight and leak proof enclosure around said opening.

* * * * *